(12) United States Patent
Nakada et al.

(10) Patent No.: US 7,032,446 B2
(45) Date of Patent: Apr. 25, 2006

(54) FLOWRATE MEASURING DEVICE WITH IMPROVED FLOW INTRODUCTION INTO SUB-PASSAGE OUTLET

(75) Inventors: Keiichi Nakada, Hitachinaka (JP); Izumi Watanabe, Hitachinaka (JP); Junichi Horie, Hitachinaka (JP); Kei Ueyama, Hitachinaka (JP); Hiromu Kikawa, Hitachinaka (JP); Masamichi Yamada, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/083,403

(22) Filed: Feb. 27, 2002

(65) Prior Publication Data

US 2003/0046996 A1 Mar. 13, 2003

(30) Foreign Application Priority Data

Sep. 11, 2001 (JP) .............................. 2001-274402

(51) Int. Cl.
*G01F 1/68* (2006.01)
(52) U.S. Cl. .................... 73/202.5; 73/204.22
(58) Field of Classification Search ............... 73/202.5, 73/202.11
See application file for complete search history.

(56) References Cited

U.S. PATENT DOCUMENTS

| | | | | |
|---|---|---|---|---|
| 5,537,870 A | * | 7/1996 | Zurek et al. | 73/202 |
| 5,631,415 A | * | 5/1997 | Igarashi et al. | 73/202.5 |
| 5,672,822 A | * | 9/1997 | Sawada et al. | 73/202.5 |
| 5,696,321 A | * | 12/1997 | Igarashi et al. | 73/202.5 |
| 5,804,718 A | * | 9/1998 | Nagasaka et al. | 73/202 |
| 5,847,275 A | * | 12/1998 | Kondo et al. | 73/202.5 |
| 5,892,146 A | * | 4/1999 | Kobayashi et al. | 73/118.2 |
| 5,894,088 A | * | 4/1999 | Sawada et al. | 73/204.19 |
| 6,079,264 A | * | 6/2000 | Yamakawa et al. | 73/204.26 |
| 6,332,356 B1 | * | 12/2001 | Hecht et al. | 73/202.5 |
| 6,336,360 B1 | * | 1/2002 | Weber | 73/204.21 |
| 6,345,531 B1 | * | 2/2002 | Mueller et al. | 73/204.22 |
| 6,571,621 B1 | * | 6/2003 | Watanabe et al. | 73/202.5 |

FOREIGN PATENT DOCUMENTS

JP 8-511627 12/1996
JP 11-248505 9/1999

* cited by examiner

*Primary Examiner*—Harshad Patel
(74) *Attorney, Agent, or Firm*—Crowell & Moring LLP

(57) ABSTRACT

There is provided a flow rate measuring device which comprises a means for introducing a backward flow of the main passage into the sub-passage through the outlet of the sub-passage of the flow rate measuring device is provided near the outlet of the sub-passage, in order to keep the flow rate measuring element from being destroyed under the presence of dust and water in an intake manifold and which has high reliability for a long period of use and an excellent pulsation characteristic.

11 Claims, 17 Drawing Sheets

FLOWRATE MEASURING DEVICE WITH IMPROVED FLOW INTRODUCTION INTO SUB-PASSAGE OUTLET

BACKGROUND OF THE INVENTION

The present invention relates to a flow rate measuring device for measuring a flow rate of a fluid and more particularly to a flow rate measuring device suited for measuring a flow rate of air taken into an internal combustion engine.

As a flow rate measuring device installed in an air intake passage of internal combustion engines as in automobiles, a thermal type has become a mainstream because of its ability to directly detect a mass flow rate. In the light of an increasing trend for stronger vehicle exhaust emission control and of a demand for improved mileage, a flow rate measuring device is being called for which can measure the flow rate with high precision even when there are intake air pulsation in the engine or when the increased pulsation cause an air flow from the engine toward an air cleaner (reverse flow). To make a precise measurement of air flow even in such states of the engine requires a flow rate measuring device with a response speed capable of following the pulsation and a direction detection function. One such known example is disclosed in JP-A11-248505.

The device disclosed in JP-A-11-248505, however, has a poor measuring accuracy for a forward flow since a fluid in a sub-passage does not flow smoothly in the forward direction. The flow conditions in the main passage and the sub-passage in the intake manifold change during an air flow pulsating state and during a backward flow state. Hence, the measuring errors increase when there is any pulsation or when a backward flow is produced. Particularly when a backward flow occurs, the measuring errors tend to increase because of a failure to pick up a sufficient amount of the backward flow. The intake air of a motor vehicle contains contaminants such as dust and oil, so the thin film portion of the flow rate measuring device is easily contaminated.

SUMMARY OF THE INVENTION

Thus, taking account of the above-mentioned problem, an object of the invention is to provide a flow rate measuring device which has high reliability even in the presence of dust and oil in the intake manifold and an excellent pulsation characteristic.

The above objective can be achieved by providing a means for introducing the backward flow into the outlet of the sub-passage.

For example, the above objective can be realized by a flow rate measuring device comprising: a sub-passage installed in a main passage through which a fluid flows; and a detection element installed in the sub-passage and capable of measuring a flow rate of a gas flowing in a forward direction and a flow rate of a gas flowing in a backward direction; wherein the sub-passage has an outlet opening in a radial direction of the main passage and a bent portion at least upstream of the detection element; wherein a means is provided near the outlet of the sub-passage to introduce the backward flow of the main passage into the sub-passage through the outlet.

Other objects, features and advantages of the invention will become apparent from the following description of the embodiments of the invention taken in conjunction with the accompanying drawings.

DESCRIPTION OF THE PREFERRED EMBODIMENTS

Figure 1:
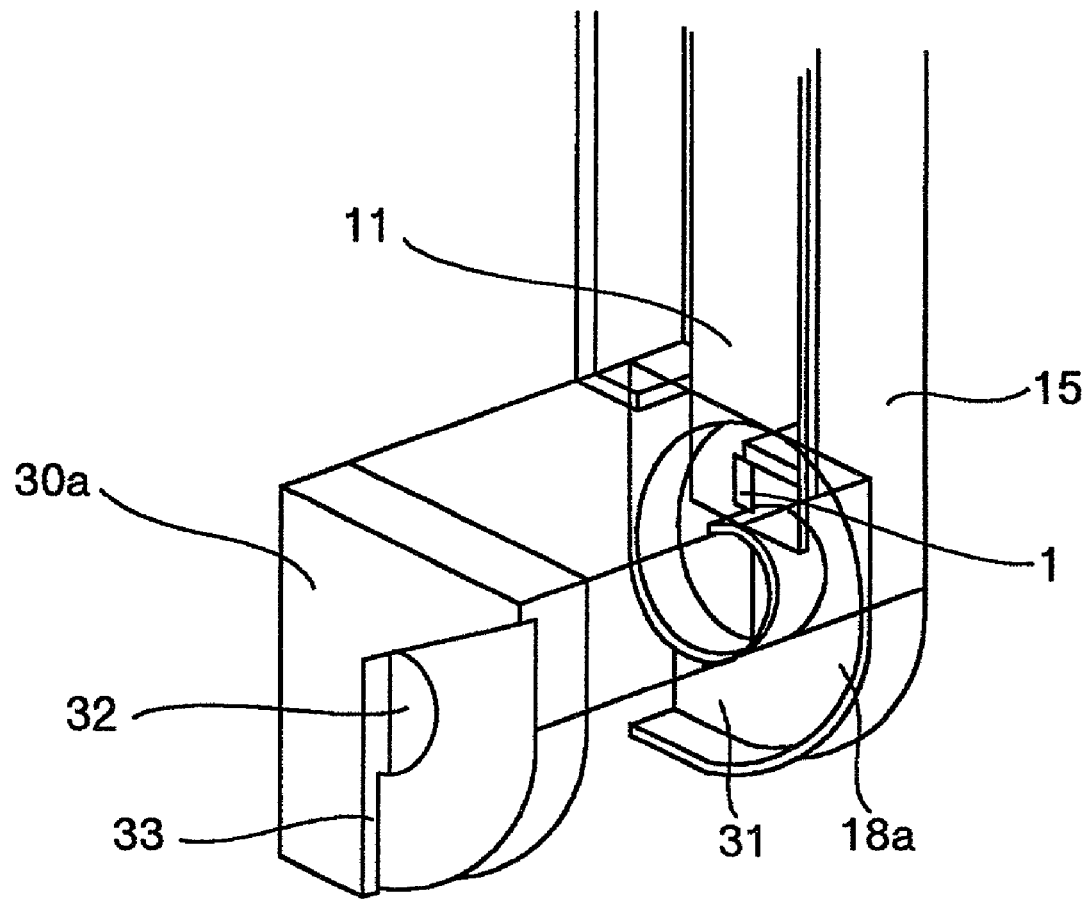
FIG. 1 is an exploded perspective view showing a arrangement of a sub-passage in a flow rate measuring device according to the invention.

Embodiments of the present invention will now be described by referring to the accompanying drawings. First, a flow rate measuring element used in this invention will be explained with reference to FIG. 2.

A flow rate measuring element 1 is manufactured using a semiconductor fabrication technology. This is detailed below. A single crystal silicon substrate 2 is formed on its surface with a silicon dioxide layer as an electric insulation layer 3 by thermal oxidation or CVD (Chemical Vapor Deposition). Then, a polycrystalline silicon layer is formed as by CVD and doped with phosphorus (P) as impurity by thermal diffusion or ion implantation to produce a desired resistance. Next, the polysilicon layer is patterned to form a heating resistor 4, an intake air temperature sensing resistor 5, and temperature measuring resistors 6, 7. The resistors may be formed from platinum or the like, though it may raise cost slightly, to obtain a high temperature coefficient.

Next, a silicon nitride layer and a silicon dioxide layer are formed as a protective layer 8 as by CVD. Then, the protective layer 8 is patterned to remove a portion of the protective layer where electrodes 13 are to be formed. Next, an aluminum layer is formed and patterned by etching. Finally, to form a hollow portion 9, a silicon nitride layer as a mask is formed by CVD on that surface of the single crystal silicon substrate 2 where the heating resistor 4 is not formed. The silicon nitride layer is then patterned and then subjected to an anisotropic etching to form the hollow portion 9. With the hollow portion 9 formed, the area where the heating resistor 4 and the temperature measuring resistors 6, 7 are arranged is constructed as a thermally insulated thin film arrangement 10. This arrangement can realize a fast response. Finally, the wafer is diced into chips. The diced flow rate measuring element 1 measures, for example, about 5 mm long by 2.5 mm wide.

Next, a carrier 11 that mounts the flow rate measuring element 1 will be explained. The carrier 11 of this invention is formed from a glass ceramic laminated substrate. The carrier 11 may also use a high-temperature sintered ceramic and a metal plate. Since the flow rate measuring element 1 should preferably be thermally insulated from surrounding members, it is effective to adopt a glass ceramic laminated substrate with a small thermal conductivity. The use of a laminated substrate makes it possible to integrate into the carrier 11 a control circuit 12 that supplies power to the flow rate measuring element 1 and processes signals from the flow rate measuring element 1. This arrangement can reduce the number of parts and is advantageous in terms of cost and reliability. Further, inner layer conductors in the laminated substrate can be used to form a circuit for controlling the flow rate measuring element 1 and thereby reduce the size of the overall circuit, which in turn is conducive to a size reduction of the flow rate measuring device 100.

Figure 3:
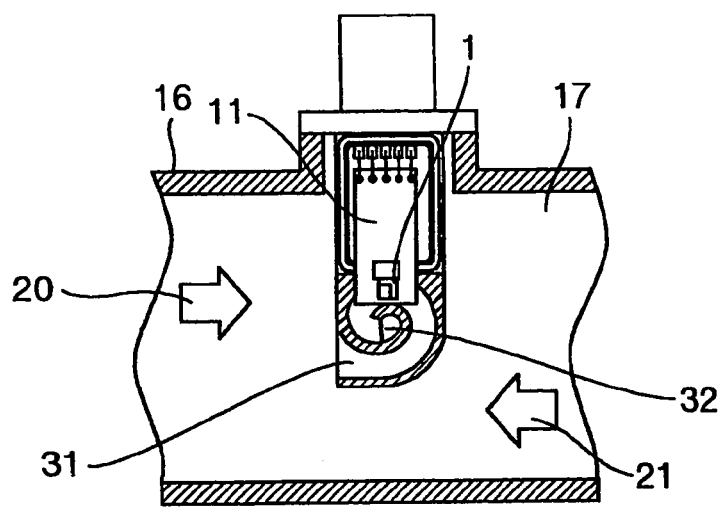
FIG. 3 is a partial plan view showing the flow rate measuring device of the invention as installed in an intake passage.

The flow rate measuring element 1 is bonded to the carrier 11 with epoxy- or silicone-based adhesive, and the electrodes of the flow rate measuring element 1 are electrically connected to the electrodes 13 of the carrier 11 through connecting lines 116 such as gold lines. The carrier 11 fitted with the flow rate measuring element 1, as shown in FIG. 3, is mounted in a housing case 15 with a silicone-based adhesive. Further, the housing case 15 is inserted in an intake passage 16. In FIG. 3, air (forward flow 20) flowing in a main passage 17 from the air cleaner toward the engine enters an inlet 31 of the sub-passage 18a and flows toward its outlet 32.

Figure 2:
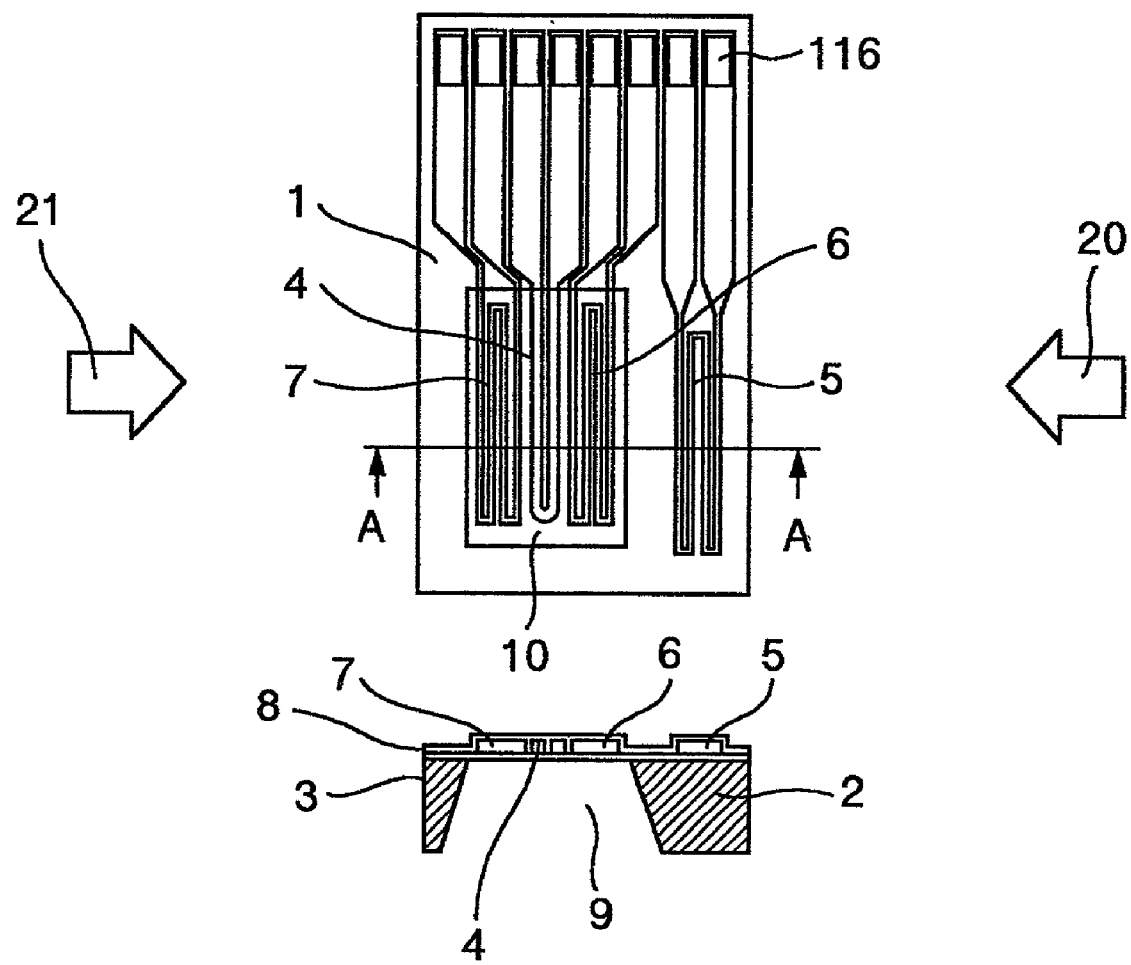
FIG. 2 is a plan view and a cross section of a flow rate measuring element used in the flow rate measuring device of the invention.
Figure 26:
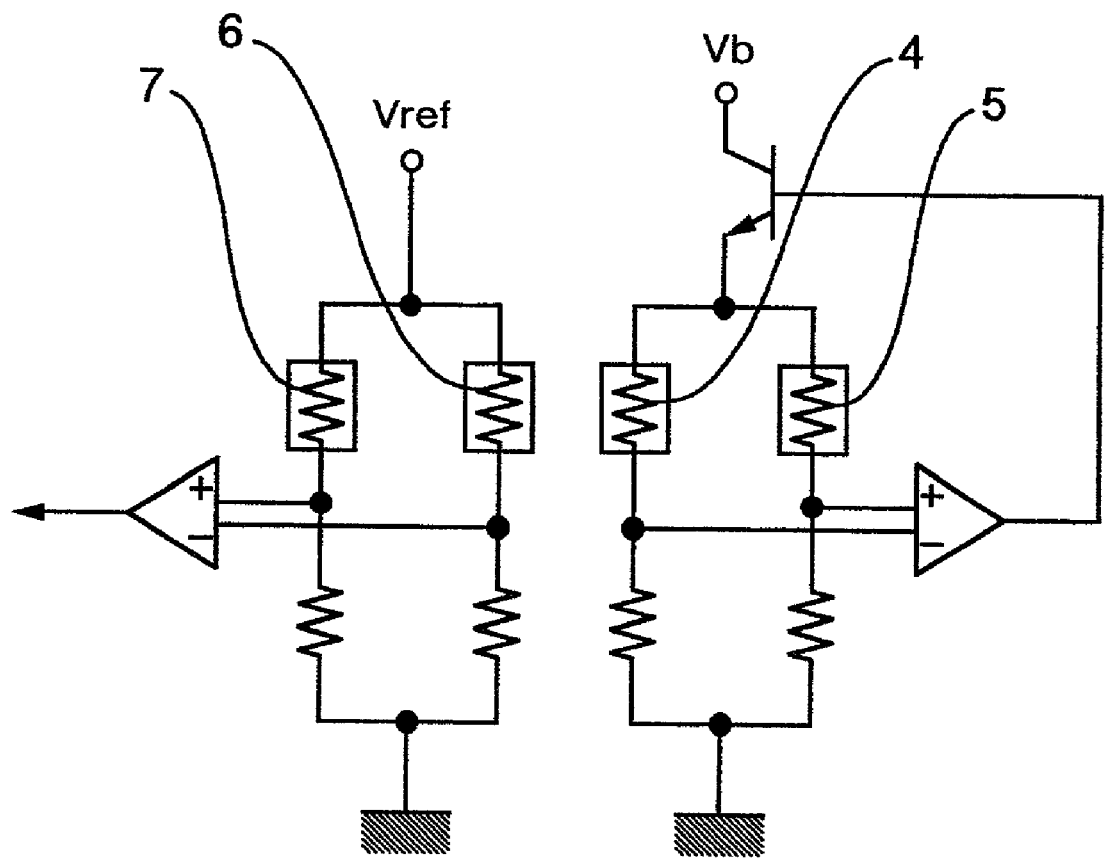
FIG. 26 is a diagram showing a principle of detecting a flow rate and a direction of an air flow by a flow rate measuring element of the invention.

Next, the working principle of the flow rate measuring element 1 will be explained by referring to FIG. 2 and FIG. 26. The heating resistor 4 is controlled at a temperature predetermined degrees higher than that of the intake air temperature sensing resistor 5. The heat of the heating resistor 4 heats the upstream temperature measuring resistor 6 and the downstream temperature measuring resistor 7 to predetermined temperatures. When there is no air flow, the upstream temperature measuring resistor 6 and the downstream temperature measuring resistor 7 receive theoretically equal quantities of heat from the heating resistor 4 so that their temperature difference is zero. When the air flow in FIG. 2 is a forward flow 20, the upstream temperature measuring resistor 6 is cooled more than the downstream temperature measuring resistor 7, with the result that a temperature difference is produced between the upstream temperature measuring resistor 6 and the downstream temperature measuring resistor 7. This causes a difference in resistance between them, generating a corresponding potential difference. The potential difference caused by the temperature difference corresponds to the amount of air flow and therefore the flow rate can be measured.

Figure 23:
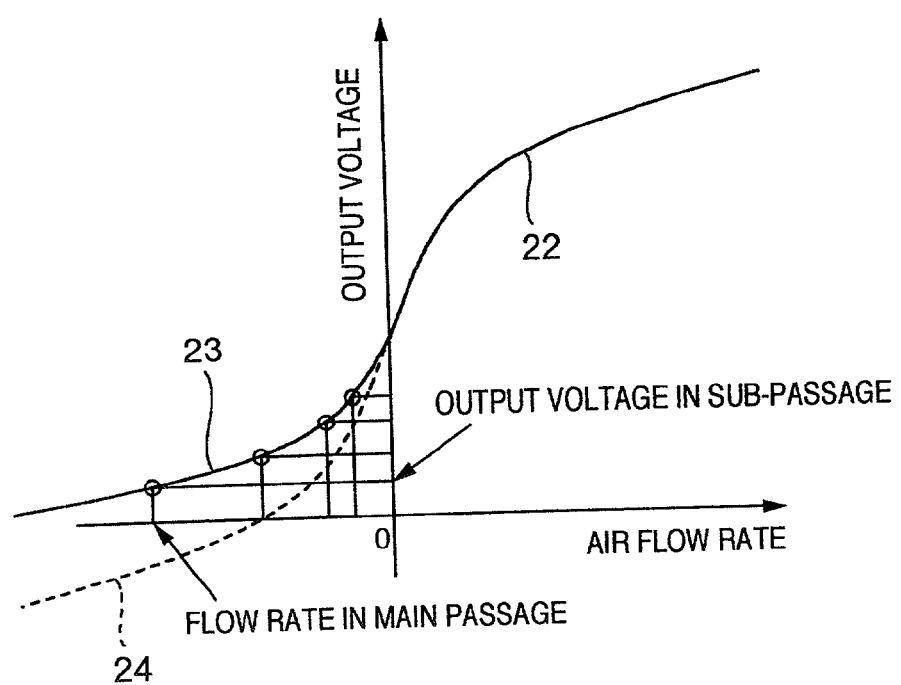
FIG. 23 is a characteristic diagram of a flow rate measuring device according to an eighth embodiment of the invention.

When on the other hand the air flow in FIG. 2 is a backward flow 21, the downstream temperature measuring resistor 7 is cooled more than the upstream temperature measuring resistor 6, which is opposite the situation described above. Therefore, in the flow rate measuring element 1 of this invention, if the intake air temperature sensing resistor 5 is not affected by heat transfer from the heating resistor 4, a forward flow characteristic curve 22 and a backward flow characteristic curve 24 exhibit a totally inverted symmetric characteristic for a voltage produced when there is no air flow, as shown in FIG. 23

Next, referring to FIG. 25, a highly reliable sub-passage 18 will be explained. Since the flow rate measuring element 1 detects a flow rate by using a phenomenon of thermal transfer to and from air (or other gases such as hydrogen gas), the flow rate cannot be measured unless the air contacts the surface of the flow rate measuring element 1. However, the flow rate measuring element 1 of this invention has a thin-film arrangement 10 about 1–2 µm thick. When dust contained in the air taken in impinges against the element or water adheres to it, the thin film arrangement 10 may be destroyed. Hence, to keep the flow rate measuring device 100 highly reliable over a long period of time, it is necessary to allow only the air to come into contact with the surface of the flow rate measuring element 1, preventing dust and water from striking it.

Figure 25:
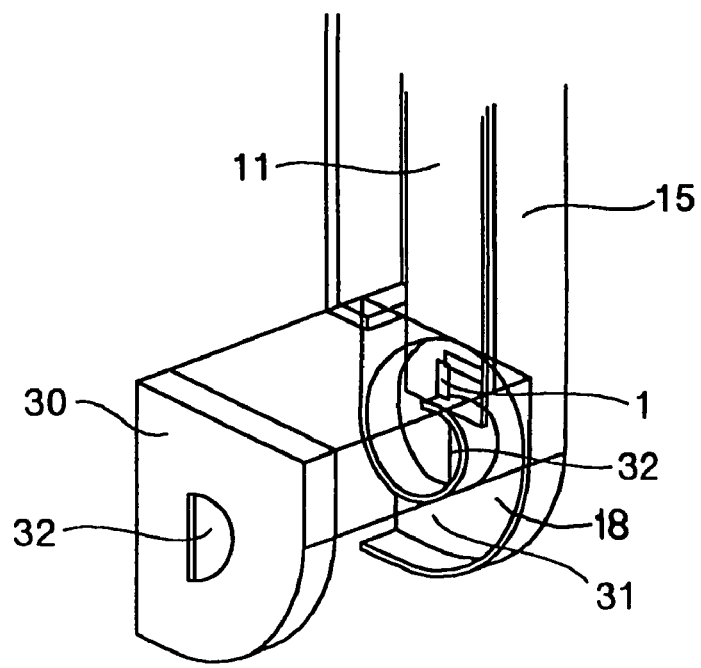
FIG. 25 is an exploded perspective view showing an arrangement of a sub-passage having an inertial effect produced by a vortex passage.

As an effective means for realizing this, a sub-passage 18 as shown in FIG. 25 may be used which can separate dust and water from air by an inertial effect. While the air flow that has entered the inlet 31 of the sub-passage travels through the vortex passage until it reaches the flow rate measuring element 1, contaminants contained in the air, such as dust and water, are urged against the outer circumferential surface of the passage by the inertial effect and discharged as is from the outlet 32. The contaminants therefore cannot reach the surface of the flow rate measuring element 1. In an experiment in which particles about 5–200 µm across were continuously thrown into the main passage 17 at a velocity of 50 m/s or higher, the marks left on the surface of the flow rate measuring element 1 indicate that it was struck only by dust 5 µm across or smaller. The thin film arrangement 10 of the flow rate measuring element 1 can be reinforced so that it can withstand particles approximately 15 µm across impinging it at a velocity of 50 m/s. Thus, the use of this sub-passage 18 can prevent a possible destruction of the element due to dust impingement. As for water, an experiment was conducted in which about 20 L/min of water was continuously thrown into the main passage 17. It was found in this experiment that the output of the flow rate measuring device did not fluctuate, indicating that no water reached the surface of the flow rate measuring element 1.

Although the sub-passage 18 has very high reliability as described above, its shape is asymmetric with respect to the backward flow 21 and the air outlet is provided on the side surface making it difficult for the backward flow 21 to enter the sub-passage. The measuring accuracy during pulsation therefore is not satisfactory.

The sub-passage of this invention will be detailed in the following.

Figure 4:
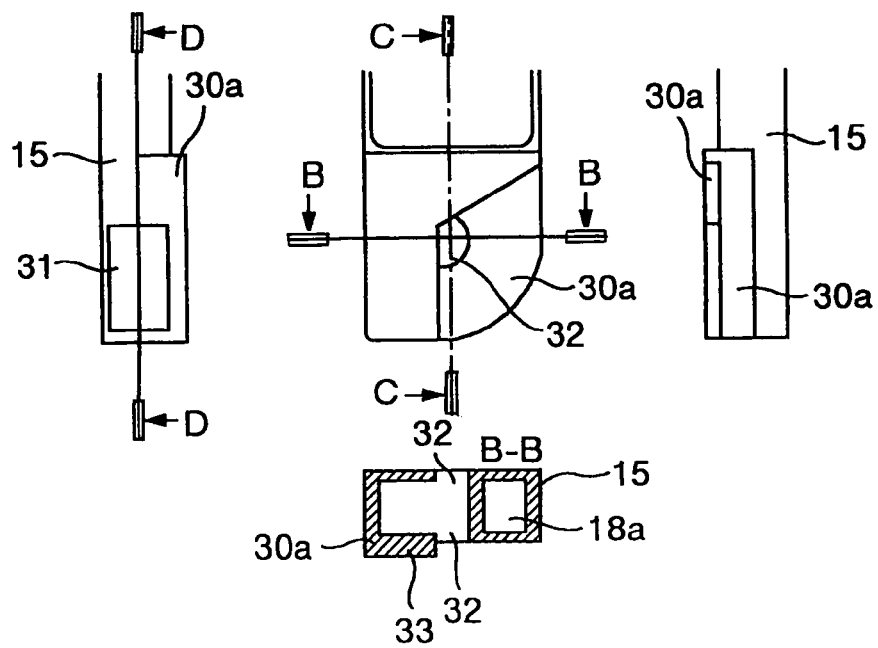
FIG. 4 shows various views and a cross section showing a first embodiment of the invention.

FIG. 1 shows a first embodiment of the present invention. This represents an arrangement that allows the backward flow 21 to be introduced relatively easily compared with the above-described sub-passage 18 of FIG. 25. FIG. 4 shows details of the sub-passage 18a of FIG. 1. The sub-passage 18a shown in FIG. 1 and FIG. 4 has a arrangement in which a sub-passage cover 30a is formed with a stepped portion 33 to ensure that, when the flow rate measuring device is seen from the downstream side, the outlet portion receives a dynamic pressure, thus allowing the backward flow 21 to be introduced easily.

Figure 6:
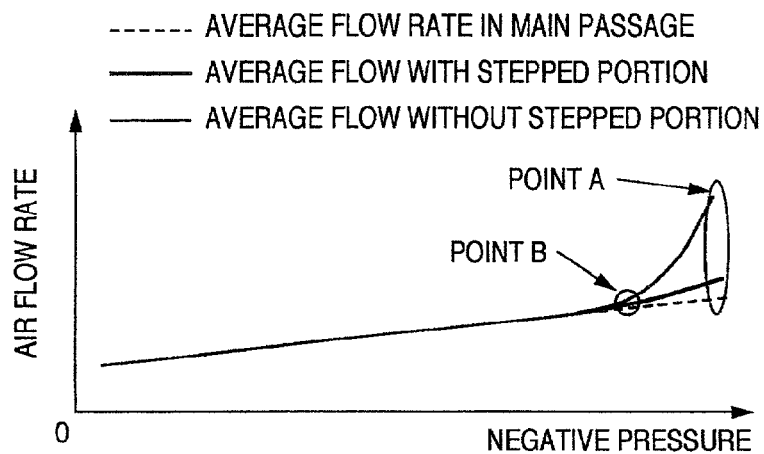
FIG. 6 shows diagrams showing an example measurement characteristic according to the invention.
Figure 6:
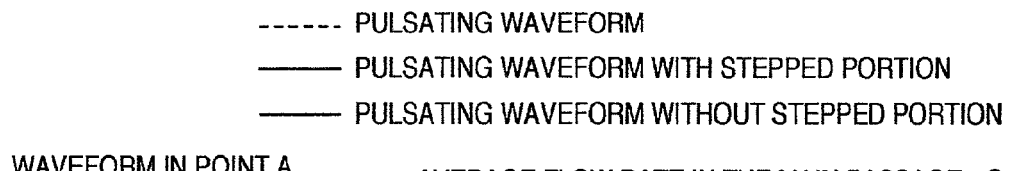
Figure 6:
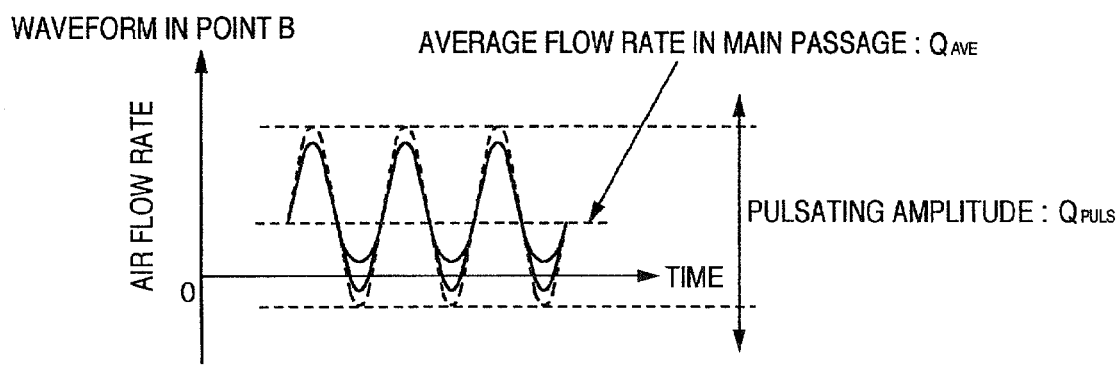

FIG. 6 shows flow rate waveforms for the arrangements with and without the stepped portion 33 when there are air flow fluctuations. Regardless of the presence or absence of the stepped portion 33, the flow rate waveforms for the forward flow 20 show little difference. But for the backward flow 21, it is seen that the arrangement with the stepped portion 33 introduces a greater amount of air. Comparison between the average flow rates with and without the stepped portion 33 indicates that when the stepped portion 33 is not used, the average flow rate is high and its positive error with respect to the average flow rate of the main passage 17 is as high as around 40%. When the stepped portion 33 is provided, the average flow rate, though it has a positive error with respect to the average flow rate of the main passage 17, is reduced to as low as about 10%.

In the sub-passage 18 shown in FIG. 25 there are two outlets. When the stepped portion 33 is provided to both of these outlets, the measuring error is not reduced very much. This is because the provision of the stepped portion 33 at both of the outlets, while it increases the introduced amount of backward flow 21, accelerates the discharge of the forward flow 20. Hence, it is particularly effective to form the stepped portion 33 at only one of the two outlets.

The measuring error can further be reduced, though not shown, by forming the stepped portion 33 at one of the two outlets and forming the other in such a shape that the forward flow 20 is not easily discharged.

When the engine has large air flow pulsation, this can be dealt with by increasing the height of the stepped portion 33. It is, however, not desirable in terms of cost and development speed to form the stepped portion 33 on such components of complicated shape as the housing case 15. Hence, by providing the stepped portion 33 to the sub-passage cover, the design modification can be made easily. Further, experiments have shown that forming the stepped portion 33 at the outlet on the surface side of the flow rate measuring element 1 is effective in reducing the measuring error. The reason for this is that the provision of the stepped portion 33 on the side of the flow rate measuring element 1 allows the backward flow 21 to be introduced easily on the surface of the carrier 11, i.e., on the side of the flow rate measuring element 1. For the backward flow, too, the action of the sub-passage similar to that for the forward flow 20 permits little or no dust and water to impinge on or adhere to the surface of the flow rate measuring element 1.

To deal with a situation where the introduced amount of the backward flow 21 is small, the measuring error may be reduced by correcting the backward flow characteristic curve as disclosed in JP-A-8-511627. This indeed is an effective means in an operation range where there is some backward flow 21. However, in the pulsating state, there is an operation state in which the backward flow 21 begins to be produced as shown at point B of FIG. 6. Even when there is a backward flow 21 in the main passage 17, it may not be generated in the sub-passage 18a. In that case, the measuring error cannot be reduced by the means for correcting the characteristic curve of the backward flow 21. Hence, the means for introducing the backward flow 21 is also effective in such passages other than the inertial ones.

Figure 5:
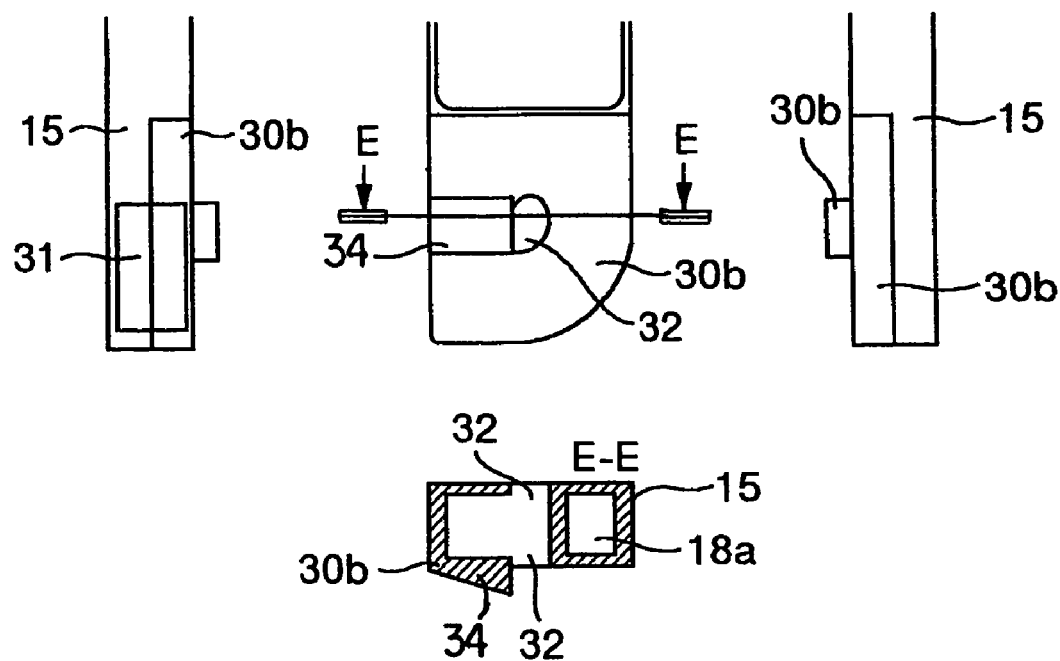
FIG. 5 shows various views and a cross section showing an arrangement of another configuration of the first embodiment of the invention.

In addition to the arrangement of the stepped portion 33 shown in FIG. 1 and FIG. 4 in which the stepped portion 33 is formed by using the entire surface of the outlet 32, it may be replaced with a projecting portion 34 as shown in FIG. 5 to produce the similar effect.

Next, a second embodiment of the invention will be described.

Figure 7:
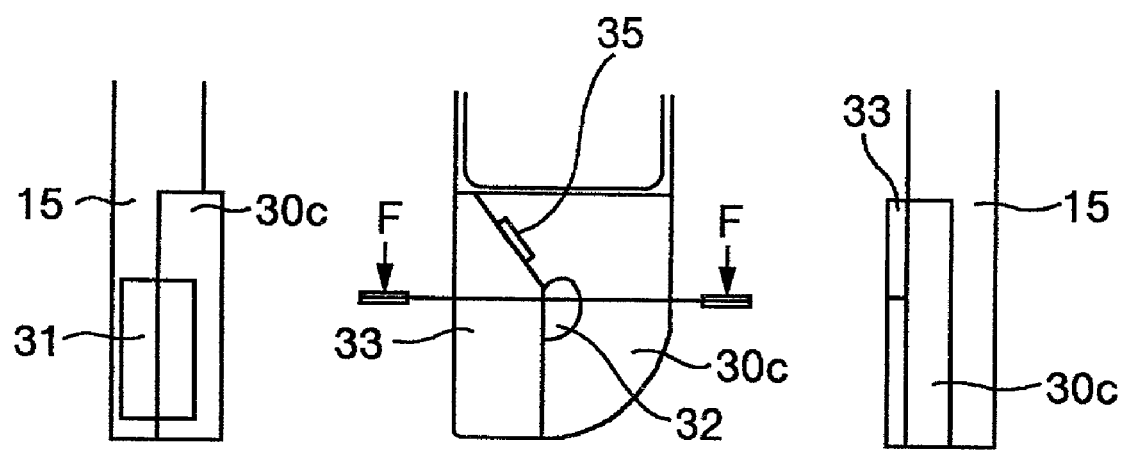
FIG. 7 shows various views and a cross section showing a second embodiment of the invention.
Figure 7:
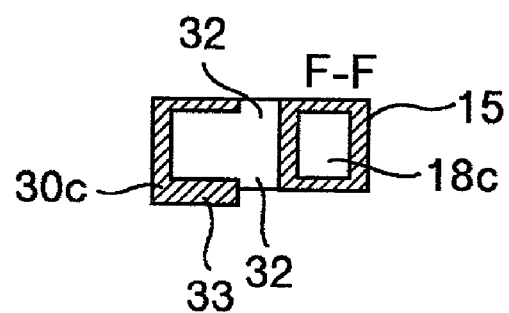
Figure 8:
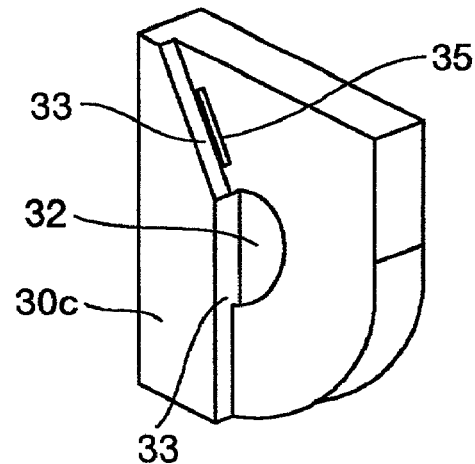
FIG. 8 is a perspective view showing the second embodiment of the invention.

FIG. 7 shows a second embodiment and FIG. 8 shows its perspective view. As shown in FIG. 7 and FIG. 8, the sub-passage 18c has a slit 35 for introducing the backward flow 21 into it and also has a stepped portion 33 formed upstream of the slit to receive a dynamic pressure. Though not shown, the hole for introducing the backward flow 21 may be a circular one. In addition to the effect provided by the first embodiment, this arrangement facilitates the introduction of the backward flow through the slit 35 and thus can further reduce the measurement error when the backward flow 21 occurs.

Next, a third embodiment of the invention will be described.

Figure 9:
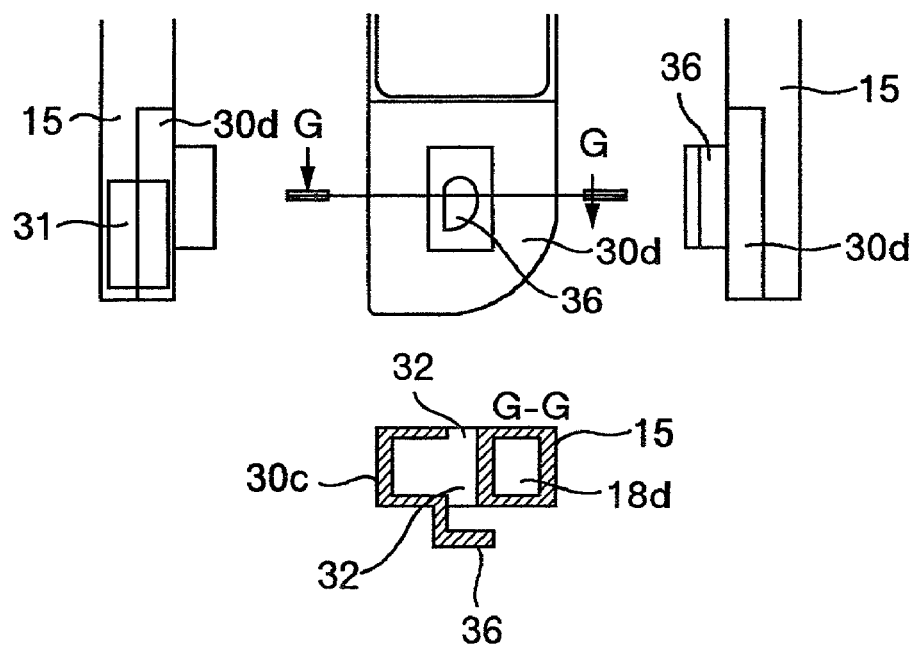
FIG. 9 is a perspective view showing a third embodiment of the invention.

FIG. 9 shows a third embodiment of the invention. FIG. 9 illustrates an arrangement in which a plate member 36 is provided to a sub-passage cover 30d to further facilitate the introduction of the backward flow.

Among the engines which have a means for returning a part of exhaust emissions to the intake manifold to comply with the automobile emission control enacted in recent years and the engines which change valve timings according to the operating condition, there are some that generate very large air flow pulsation and thus cannot achieve a sufficient measuring accuracy with the first or second embodiment described above. Although such engines may be dealt with by the first and second embodiment alone, the stepped portion 33 will become very large, resulting in degradations of other performances, such as increased pressure loss and output noise in the flow rate measuring device 100. A means shown in FIG. 9 is effectively used in such engines. In this case, too, it is preferred that this means be formed only at one of the two outlets, as in the first embodiment.

Figure 10:
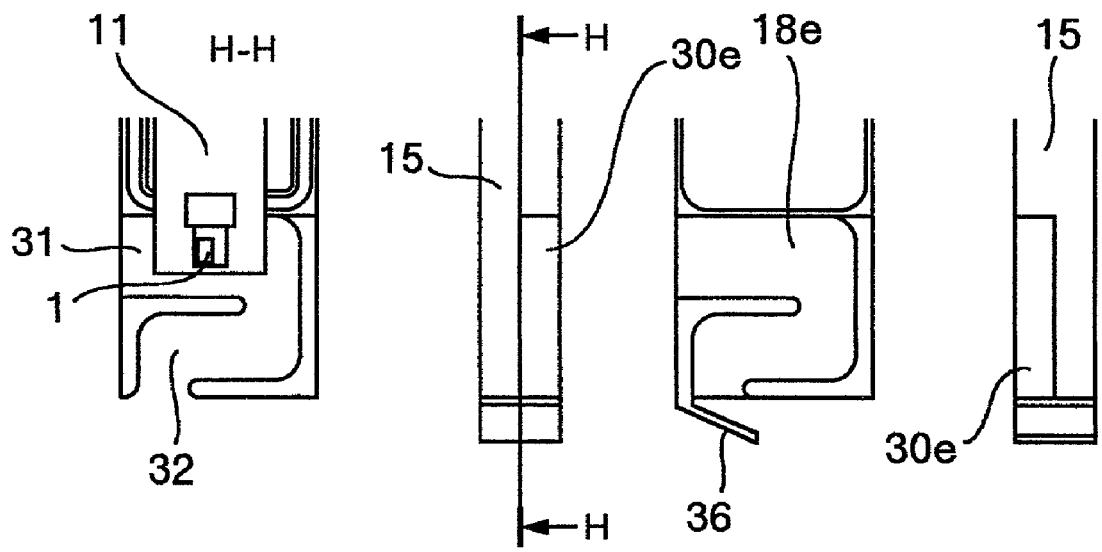
FIG. 10 shows various views and a cross section showing an arrangement of another configuration of the third embodiment of the invention.

Further, in a sub-passage with no inertial effect, such as shown in FIG. 10, when the air flow pulsation is large, the provision of the plate member 36 can produce an effect of reducing the measurement errors.

Figure 11:
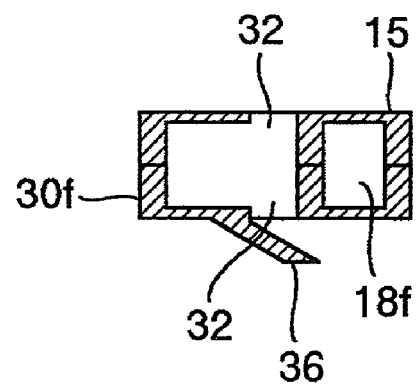
FIG. 11 is a cross section showing an arrangement of another configuration of the third embodiment of the invention.

Another example shape of the third embodiment is shown in FIG. 11.

Next, a fourth embodiment of the invention will be described.

Figure 12:
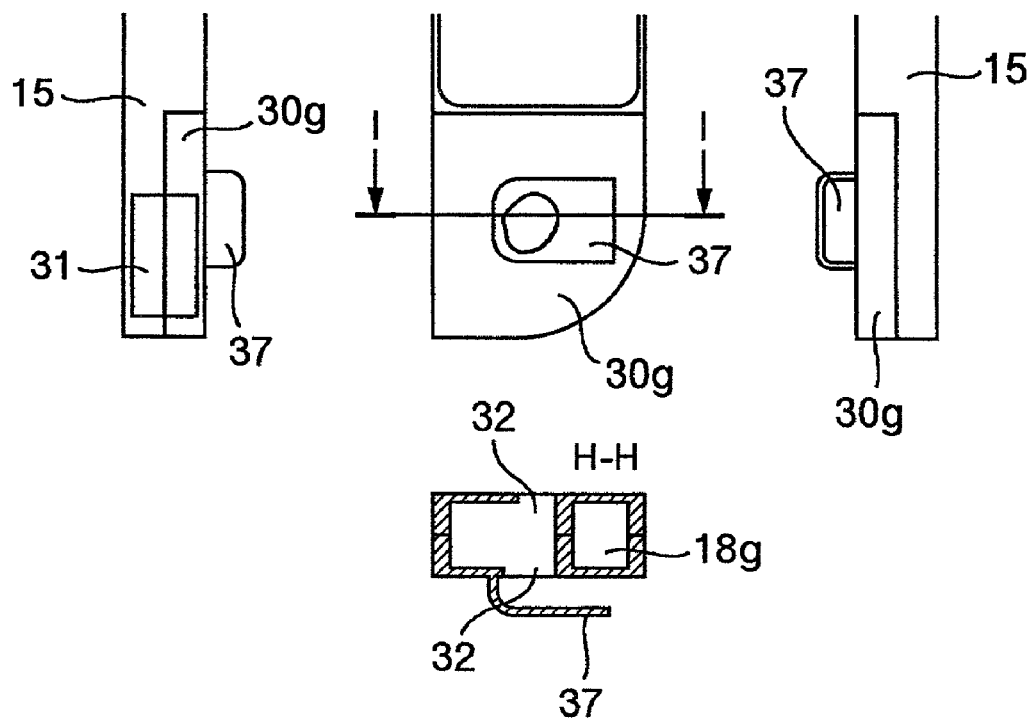
FIG. 12 shows various views and a cross section showing a fourth embodiment of the invention.

FIG. 12 shows a plan view of a fourth embodiment of the present invention. FIG. 12 illustrates an arrangement in which another passage 37 is formed extending from the outlet 32 of a sub-passage cover 30g. Forming the outlet in this configuration can facilitate the introduction of the backward flow 21 in the air flow pulsation state. This arrangement has an effect of reducing output noise compared with the first to third embodiment. This arrangement, however, has a drawback. Although a large volume of backward flow 21 introduced results in very small measurement errors and a good characteristic in an engine revolution range of 600–1200 rpm, it degrades the response to pulsation in the main passage 17 in a range of 2000 rpm or higher, prolonging the time it takes to switch from deceleration to acceleration of the air flow velocity in the sub-passage 18g. This lowers the average flow rate below the average flow rate of the main passage 17 and thus tends to generate negative errors. It can therefore be said that although the fourth embodiment is very effective for engines that produce a large backward flow 21 in a revolution range of around 600–1200 rpm, the arrangements shown in the first to third embodiment are more advantageous for engines that produce a large backward flow 21 in a revolution range of 2000 rpm or higher.

Figure 13:
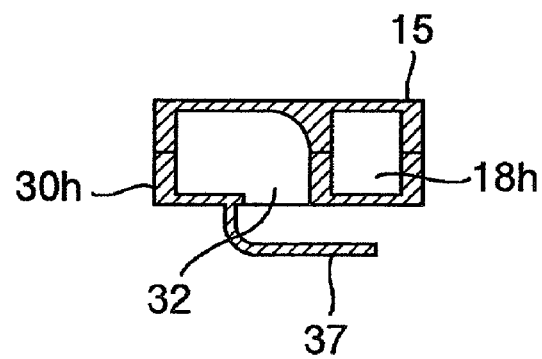
FIG. 13 is a cross section showing an arrangement of another configuration of the fourth embodiment of the present invention.

FIG. 13 shows an arrangement in which two sub-passage outlets 32 used in the arrangement of FIG. 12 are changed into only one sub-passage outlet. This arrangement further reduces output noise from that of the arrangement of FIG. 12 and, when compared with the first embodiment, the noise reduction can reach about 60% at maximum.

Figure 14:
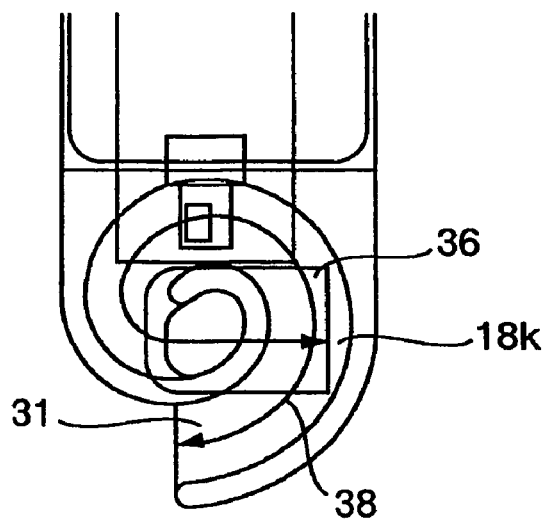
FIG. 14 is a plan view showing an arrangement of still another configuration of the fourth embodiment of the invention.

FIG. 14 shows a sub-passage 18k which has the inlet 31 set back compared with that of the sub-passage of FIG. 13 so that a distance from the sub-passage inlet 31 to the surface of the flow rate measuring element 1 is almost equal to a distance from the surface of the flow rate measuring element 1 to the outlet 32. The arrangement shown in FIG. 13 has very small measurement errors exhibiting a good characteristic in an engine revolution range of 600–1200 rpm but, in a range of 2000 rpm or higher, tends to produce negative errors, as is the case with FIG. 12. The arrangement of FIG. 14, however, eliminates waveform distortions at a revolution of 2000 rpm observed in the arrangement of FIG. 12 and therefore is advantageous for the engine with large pulsation amplitudes.

Next, a fifth embodiment of the invention will be described.

Figure 15:
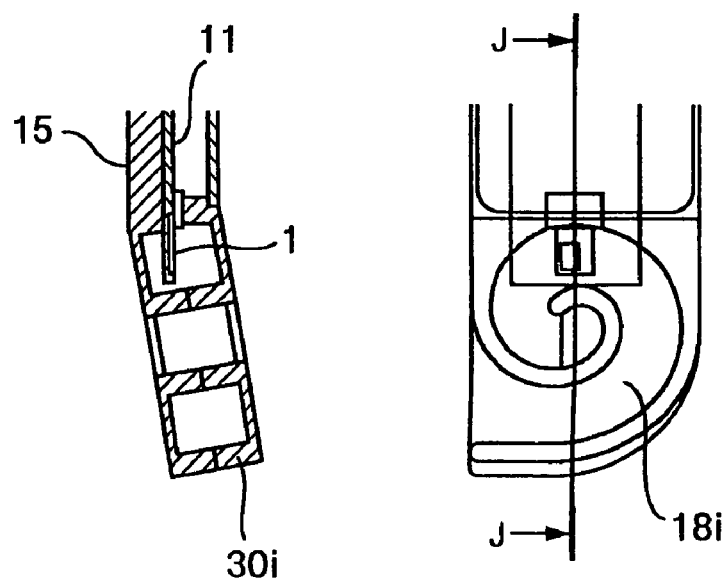
FIG. 15 is a cross section showing a fifth embodiment of the invention.
Figure 27:
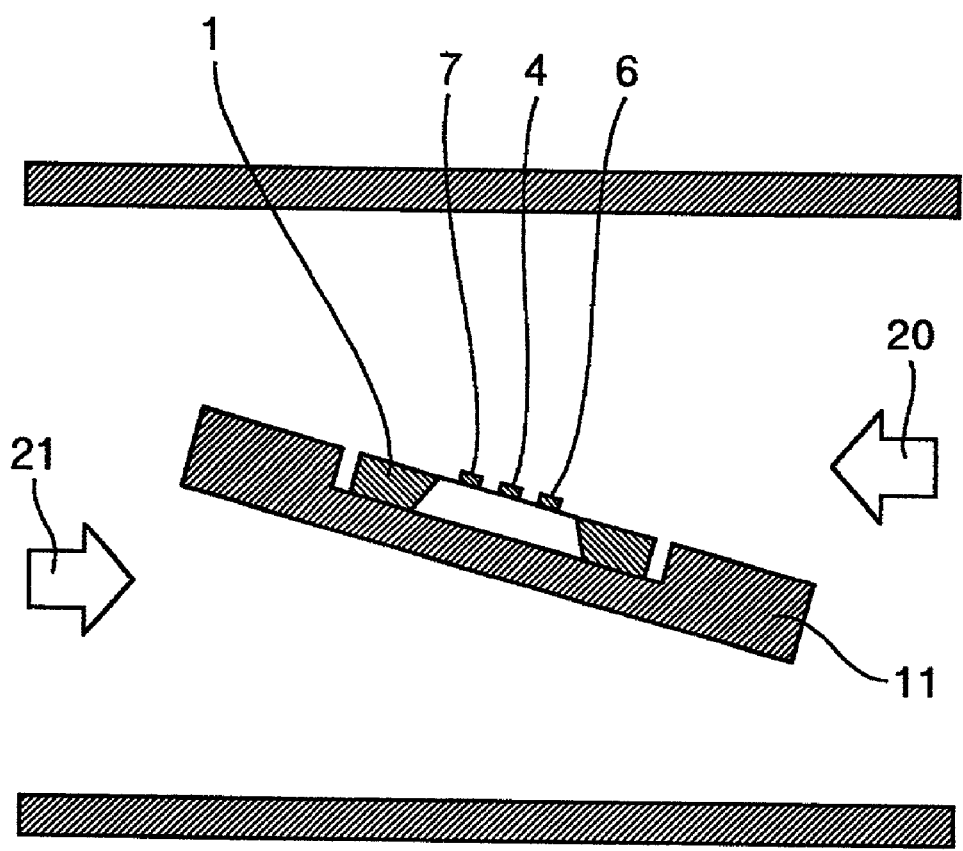
FIG. 27 is a cross section of a carrier inclined.

FIG. 15 shows a fifth embodiment of the invention. In a plate type flow rate measuring element 1, it is a known technique to reduce the output noise by slanting the element with respect to the air flow, as shown in FIG. 27. In a flow rate measuring device of a backward flow detection type, however, the slanting of the element to improve the characteristic for the forward flow 20 degrades the sensitivity and output noise characteristic for the backward flow 21, increasing the measurement errors when pulsation occur. In a sub-passage 18i of the fifth embodiment of the invention, however, since the forward flow 20 and the backward flow 21 both come into contact diagonally with the surface of the flow rate measuring element 1, the output noise is lowered. This in turn reduces the measurement errors in a state where output noise is easily generated, as in an air flow pulsating state.

Figure 16:
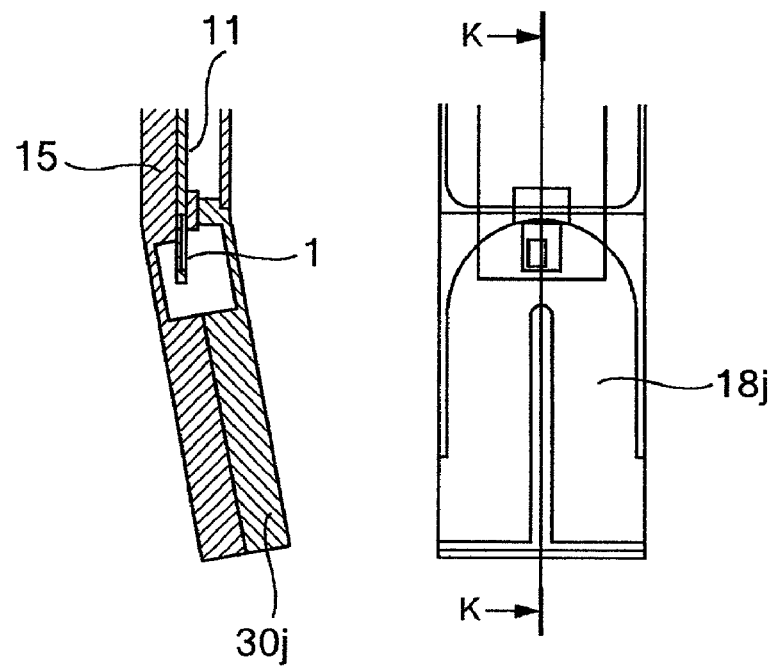
FIG. 16 is a cross section showing an arrangement of another configuration of the fifth embodiment of the invention.

FIG. 16 shows another embodiment that has an effect of reducing the output noise as in the case of FIG. 15.

Next, a sixth embodiment of the invention will be described.

Figure 17:
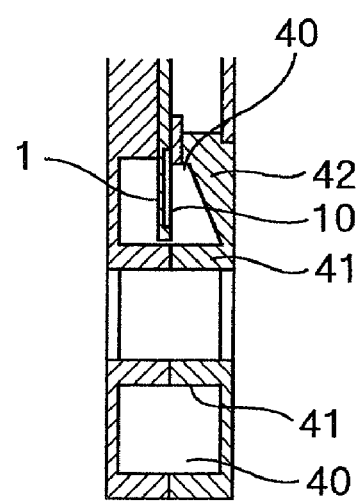
FIG. 17 is a cross section showing a sixth embodiment of the invention.

FIG. 17 shows a partial cross section of the sixth embodiment of the invention, which is equivalent to the E—E cross section of FIG. 5.

In a sub-passage of this invention in which the inertial effect is produced by the vortex configuration, if the cross section of the passage is square, the air velocity at the surface of the flow rate measuring element 1 is faster on the inner side of the vortex than on the outer side when the air flow is steady. When there are air flow pulsation, the velocity distribution in the sub-passage changes from that of the steady state condition and becomes uniform. Because dust and water flow along an outer circumference 40 of the sub-passage due to the inertial effect, the thin film arrangement 10 of the flow rate measuring element 1 is located near an inner circumference 41 of the sub-passage. Hence, the air velocity tends to slow down near the surface of the flow rate measuring element 1 during the pulsation state. There is a tendency therefore that during the pulsation state negative errors are easily produced. In the sixth embodiment, as shown in FIG. 17, the distance from a contracted portion 42 to the surface of the flow rate measuring element 1 is made to decrease toward the outer circumference 40 of the sub-passage. With this arrangement, a velocity distribution is not easily generated at the position of the flow rate measuring element 1 even during the steady state. This in turn can reduce the measurement errors during the air flow pulsation state.

Next, a seventh embodiment of the invention will be explained by referring to FIG. 18 to FIG. 20.

Figure 18:
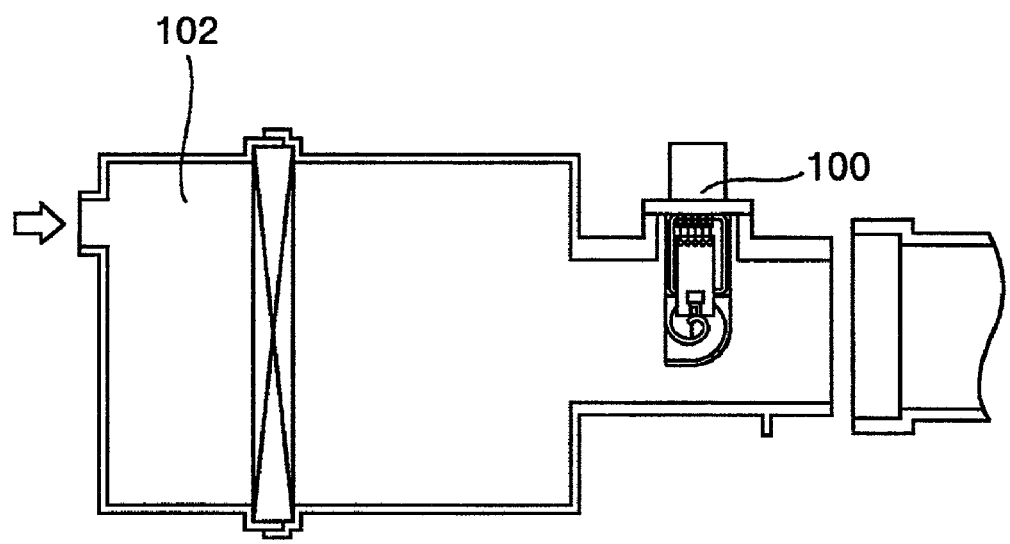
FIG. 18 is a partial plan view showing the flow rate measuring device of the invention as installed in an air cleaner.

FIG. 18 shows the flow rate measuring element 100 installed in an air cleaner 102. A technique is known in recent years which integrates the flow rate measuring device 100 in the air cleaner 102 from the standpoint of cost reduction, as shown in FIG. 18.

The pulsation generated in the intake manifold depend largely on the length of the intake manifold, or the distance from the engine to the inlet of the intake manifold, i.e., the most upstream portion of the air cleaner 102. When the length of the intake manifold changes, for example, a phenomenon is observed in which the engine revolution speed at which the backward flow 21 occurs varies greatly. Even in the same engine, the pulsation state changes greatly according to the shape of the intake manifold and the air cleaner 102. When different engines are considered, the pulsation states are naturally different from each other. Although these pulsation states that vary in many ways can be dealt with by only the flow rate measuring device 100, it is required that the sub-passage arrangement in the flow rate measuring device be changed for each air cleaner and engine.

Figure 19:
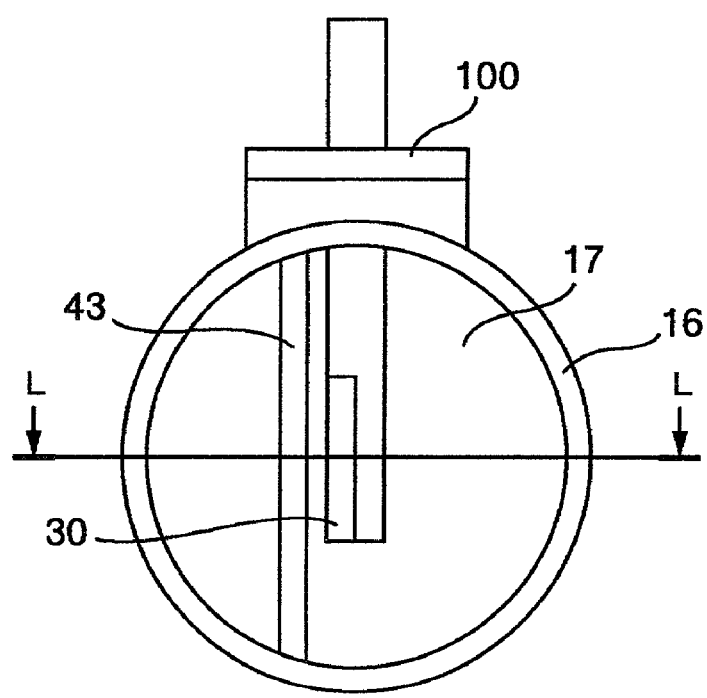
FIG. 19 is a schematic diagram showing a seventh embodiment of the invention.
Figure 20:
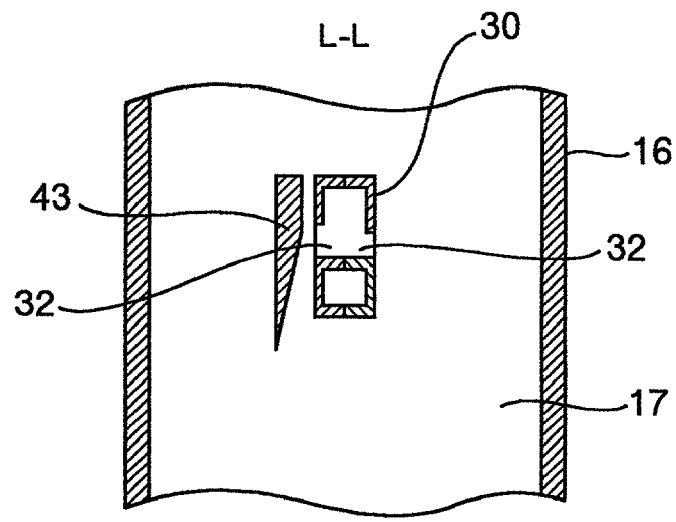
FIG. 20 is a cross section showing the seventh embodiment of the invention.

Hence, in situations where various requirements cannot be met fully by the flow rate measuring device alone, it is very advantageous to provide a backward flow introduction member 43 in an intake passage 16 in which the flow rate measuring device is installed, as shown in FIG. 19 and FIG. 20.

Figure 21:
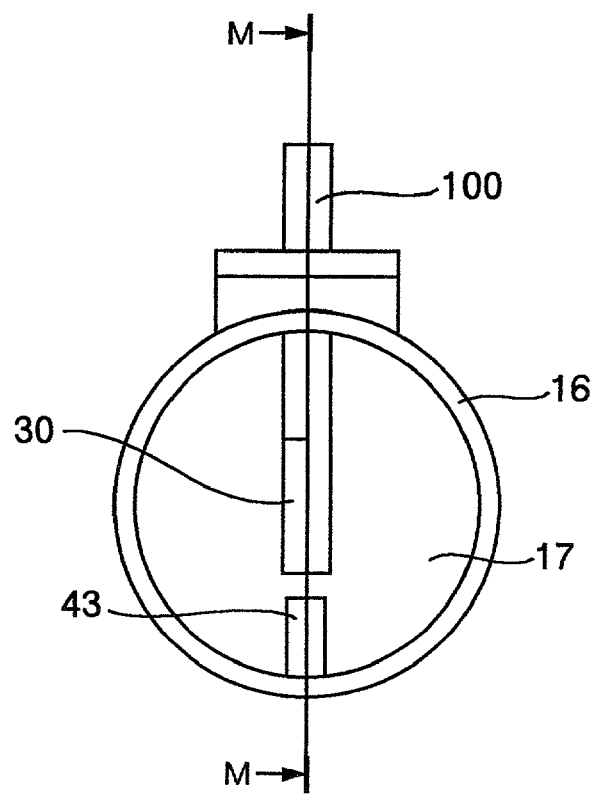
FIG. 21 is a schematic diagram showing an arrangement of another configuration of the seventh embodiment of the invention.
Figure 22:
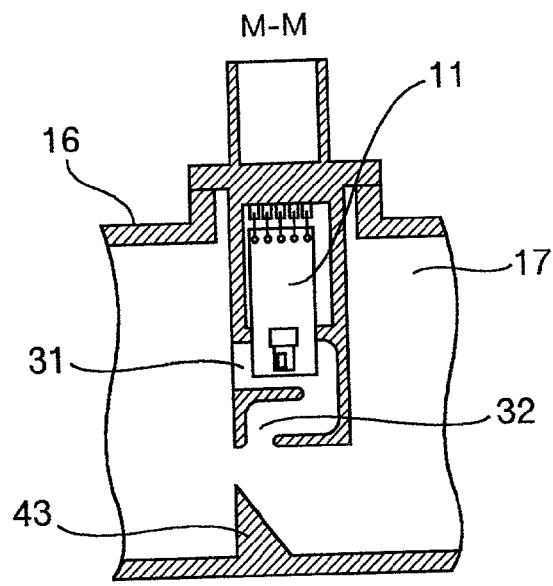
FIG. 22 is a cross section showing an arrangement of still another configuration of the seventh embodiment of the invention.

FIG. 21 and FIG. 22 show the seventh embodiment of the invention as installed in the sub-passage 18e of FIG. 10.

Next, an eighth embodiment of the invention will be described.

FIG. 23 shows a characteristic curve for the eighth embodiment of the invention, which represents a relation between a flow rate and an output of the flow rate measuring device. In FIG. 23, the backward flow characteristic curve 24 is inversely symmetric to the forward flow characteristic curve 22, as described earlier. When the flow rate measuring element 1 is arranged in a forward-backward asymmetric sub-passage, the backward flow characteristic curve 24 deviates largely from a backward flow characteristic curve 23.

It is therefore desired that the flow rate-output characteristic in the forward-backward asymmetric sub-passage be used as a backward flow characteristic curve. Because the flows in the main passage 17 and the sub-passage during the pulsation state are totally different from those of the steady state, the use of the air flow rate and the flow rate measuring device output during the steady state as the backward flow characteristic curve is not very effective.

The eighth embodiment of this invention determines the backward flow characteristic curve 23 from the flow rate in the main passage 17 and the output of the flow rate measuring device 100 during the pulsating condition. First, the flow rate in the main passage 17 is measured simultaneously by (1) a flow meter with a response speed of about 100 kHz well capable of following the pulsation and by (2) the flow rate measuring device 100 having the flow rate measuring element 1 installed in the sub-passage. Next, based on the two waveforms obtained, the flow rate of the flow meter installed in the main passage 17 is allocated to the output obtained by the flow rate measuring device 100 to set the backward flow characteristic curve 23.

By using the means of the eighth embodiment, the backward flow characteristic curve 23 is set for each engine. This method is very advantageous as it eliminates the need for changing the shape of the flow rate measuring device 100 for each engine or for employing the means shown in the seventh embodiment.

With the technique described above, however, it is not possible in the sub-passage to perfectly follow the pulsation in the main passage 17, so the above technique has a somewhat poor response to the pulsation in the main passage 17 for the forward flow 20 and, for the backward flow 21, the same response as in the main passage 17. Hence, the average flow rate tends to be slightly negative. It is therefore an effective means to correct the backward flow characteristic curve 23 by an amount corresponding to the degree to which the pulsation of the forward flow 20 cannot be followed.

Figure 24:
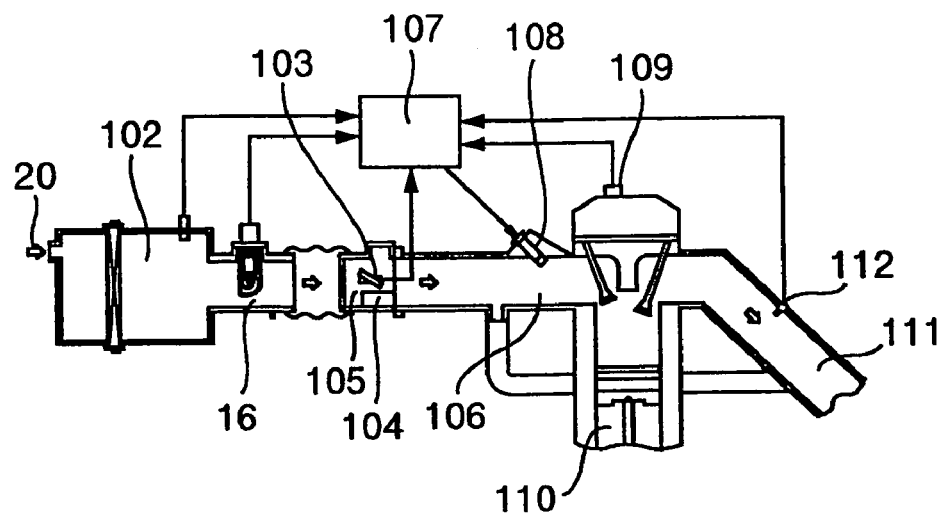
FIG. 24 is a control system diagram of an internal combustion engine using the flow rate measuring device of the invention.

FIG. 24 shows a system diagram of an internal combustion engine such as a gasoline engine. Air to be taken into the engine flows through an air intake passage 16, which includes an air cleaner 102, an air intake passage 16, a throttle angle sensor 103, an idle speed control valve 104, a throttle body 105, and an intake manifold 106. As the air drawn in flows through the intake passage 16, its flow rate and direction are detected by the flow rate measuring device 100 of this invention. The signals thus detected are sent as a voltage or frequency to a vehicle control unit 107.

The flow rate signal is used for the control of a combustion arrangement and subsystem consisting of an injector 108, a tachometer 109, an engine cylinder 110, an intake manifold 111 and an oxygen density meter 112.

A diesel engine system, though not shown, has basically the same configuration as the gasoline system and thus can use the flow rate measuring device of this invention.

This embodiment therefore can provide a flow rate measuring device which is protected against destruction even when there is dust and water in the intake manifold, and which has high reliability for a long period of use and an excellent pulsation characteristic. Further, even in engines with large pulsation amplitudes, a flow rate measuring device with small measurement errors can be provided. Moreover, in engines that generates a backward flow 21 in all revolution ranges, a flow rate measuring device with small measurement errors can be provided.

Further, this embodiment can provide a flow rate measuring device with smaller output noise also in a steady state than that of a conventional passage having an inertial effects.

With this invention, a flow rate measuring device can be provided which has high reliability even when there is dust or oil in the intake manifold and also an excellent pulsation characteristic.

It should be further understood by those skilled in the art that the foregoing description has been made on embodiments of the invention and that various changes and modifications may be made in the invention without departing from the spirit of the invention and the scope of the appended claims.

What is claimed is:

1. A flow rate measuring device comprising:
   a sub-passage installed in a main passage through which a fluid flows;
   a detection element installed in the sub-passage and capable of measuring a flow rate of a gas flowing in a forward direction and a flow rate of a gas flowing in a backward direction, the detection element provided with a sub-passage upstream temperature measuring resistor and a sub-passage downstream temperature measuring resistor, the sub-passage having an outlet opening in a radial direction of the main passage and a bent portion at least upstream of the detection element; and
   introducing means provided near the outlet of the sub-passage and at a peripheral portion of the outlet of the sub-passage to introduce backward flow of the main passage into the sub-passage through the outlet.

2. A flow rate measuring device according to claim 1, wherein the introducing means introduces the backward flow into the sub-passage through the outlet by a dynamic pressure generated by the backward flow.

3. A flow rate measuring device according to claim 2, wherein the introducing means is a stepped portion defining a side surface which is set higher downstream of the outlet in the backward direction than upstream of the outlet in the backward direction.

4. A flow rate measuring device according to claim 3, wherein the introducing means is constructed to facilitate the introduction of the backward flow more than the forward flow.

5. A flow rate measuring device according to claim 4, wherein the introducing means blocks the forward flow from entering into the sub-passage through the outlet.

6. A flow rate measuring device according to claim 5, wherein the sub-passage is constructed of at least two members and the introducing means is formed on only one of the two members.

7. A flow rate measuring device according to claim 5, wherein the introducing means is formed in the main passage.

8. A flow rate measuring device according to claim 7, wherein a length of a part of the sub-passage from an inlet of the sub-passage to the detection element is almost equal to a length of another part of the sub-passage from the detection element to the outlet of the sub-passage.

9. A flow rate measuring device according to claim 8, wherein the outlet is formed at two locations, the detection element is formed on one surface of a substrate, and the introducing means is provided only near the outlet that is formed on the same side as the one surface of the substrate.

10. A flow rate measuring device according to claim 1, wherein the sub-passage has the bent portion between the outlet and the detection element.

11. A flow rate measuring device according to claim 1, wherein a width of the introducing means with respect to the backward direction is larger than a width of the outlet of the sub-passage.

* * * * *